(12) United States Patent
Watarai et al.

(10) Patent No.: US 6,192,300 B1
(45) Date of Patent: Feb. 20, 2001

(54) BICYCLE COMPUTER

(75) Inventors: Etsuyoshi Watarai, Izumi (JP); Chun-Mu Huang, San Chung (TW)

(73) Assignees: Echowell Electronic Ltd.; Shimano, Inc.

( * ) Notice: Under 35 U.S.C. 154(b), the term of this patent shall be extended for 0 days.

(21) Appl. No.: 08/896,309

(22) Filed: Jun. 27, 1997

(51) Int. Cl.[7] .................................................. G06F 19/00
(52) U.S. Cl. .................................................. 701/1; 340/432
(58) Field of Search ........................ 701/1, 48; 340/432; 482/901; 702/148; 474/70

(56) References Cited

U.S. PATENT DOCUMENTS

| 4,071,892 | * | 1/1978 | Genzling | 702/148 |
| 4,636,769 | * | 1/1987 | Tsuyama | 324/174 |
| 4,828,257 | * | 5/1989 | Dyer et al. | 482/901 |
| 5,177,432 | * | 1/1993 | Waterhouse et al. | 340/432 |
| 5,261,858 | | 11/1993 | Browning | 474/69 |
| 5,357,177 | | 10/1994 | Fey et al. | 318/3 |
| 5,483,137 | | 1/1996 | Fey et al. | 318/560 |
| 5,644,511 | * | 7/1997 | McWhorter | 702/148 |
| 5,728,017 | * | 3/1998 | Bellio et al. | 474/70 |
| 5,737,247 | * | 4/1998 | Baer et al. | 340/432 |
| 5,847,641 | | 12/1998 | Jinbo | 340/432 |

FOREIGN PATENT DOCUMENTS

| 3445617 | 7/1985 | (DE) . |
| 296 04 853 U 1 | 7/1996 | (DE) . |
| 59-92812 | 6/1984 | (JP) . |
| 62-237895 | 10/1987 | (JP) . |
| 4-104088 | 9/1992 | (JP) . |
| 5-16041 | 4/1993 | (JP) . |
| 6-35573 | 2/1994 | (JP) . |
| 6-203287 | 7/1994 | (JP) . |
| 6-317601 | 11/1994 | (JP) . |
| 7-17461 | 1/1995 | (JP) . |
| 7-96877 | 4/1995 | (JP) . |
| 7-210790 | 8/1995 | (JP) . |
| 7-282905 | 10/1995 | (JP) . |
| 8-133165 | 5/1996 | (JP) . |

OTHER PUBLICATIONS

European Search Report for EP 98111009.1, dated Sep. 28, 1998.
Patent Abstracts of Japan, vol. 7, No. 249, English abstract of JP 58–132807, published Aug. 8, 1983.

* cited by examiner

Primary Examiner—Gary Chin
(74) Attorney, Agent, or Firm—James A. Deland (57) ABSTRACT

A bicycle cycle computer includes a main unit having a primary microprocessor, a display and tlree contacts; a plurality of sensors; and a secondary microprocessor provided on the bicycle and connected between the plurality of sensors and the main unit, for receiving parallel signals outputted from the plurality of sensors, the secondary microprocessor converting the received parallel signals into a serial signal and generating a synchronous clock signal, which are transmitted to the main unit through two of the contacts of the main unit, processed by the primary microprocessor and displayed on the display.

30 Claims, 8 Drawing Sheets

BICYCLE COMPUTER

BACKGROUND OF THE INVENTION

The present invention relates to a bicycle cycle computer for displaying various kinds of information regarding the speed, the pedal revolution per minute (rpm), the gear in operation, the pulse of the rider, the ambient temperature, the geographical height and the like.

Figure 1:
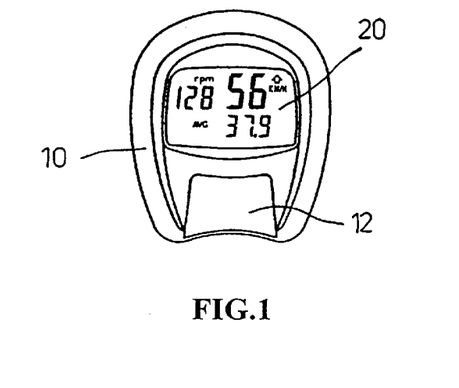
FIG. 1 is a front view showing a main unit of a conventional bicycle cycle computer.
Figure 2:
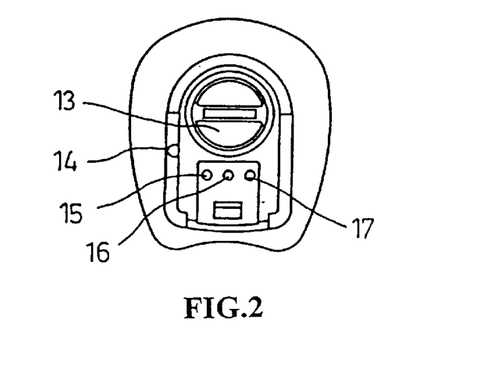
FIG. 2 is rear view showing the main unit of the conventional cycle computer of FIG. 1.

Generally speaking, since a bicycle cycle computer is mounted on a bicycle and mainly used outdoors, it is required to be not only compact but also waterproof, shockproof and weatherproof. As shown in FIG. 1, a conventional, commercially available bicycle cycle computer comprises a main unit 10, and a display 20 for displaying data, such as the is speed, the distance traveled, the time and the pedal rpm, is provided on the front surface of the main unit 10. A mode button 12 for selecting different displaying modes is provided below the display 20. FIG. 2 shows the back of the main unit 10. In FIG. 2, reference numeral 13 denotes a battery cap for covering a battery accommodating chamber, 14 denotes a set button for switching among different data setting modes, 15 and 16 denote metal contacts for transmitting respective signals representing the detected speed and the detected pedal rpm (which will be described later) to a microprocessor (not shown) installed inside the main unit 10, and 17 denotes a metal contact as a common ground.

Figure 3:
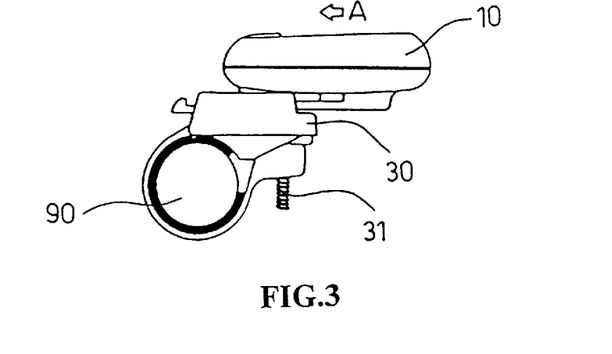
FIG. 3 is a side view showing the state of the main unit of FIG. 1 mounted on a bracket.

In addition, in order to prevent the main unit 10 from being stolen, the main unit 10 is preferably made to be detachable from the bicycle and portable. For this purpose, a conventional cycle computer is usually equipped with a bracket 30, as shown in FIG. 3, which is mounted on a handlebar 90 of a bicycle by means of a screw 31. The main unit 10 can be inserted in the direction indicated by the arrow A as shown in FIG. 3 so as to be detachably mounted onto the bracket 30. Thus, the rider can easily remove the main unit 10 from the bracket 30 whenever the bicycle is not in use, and mount the main unit 10 again later.

Figure 4:
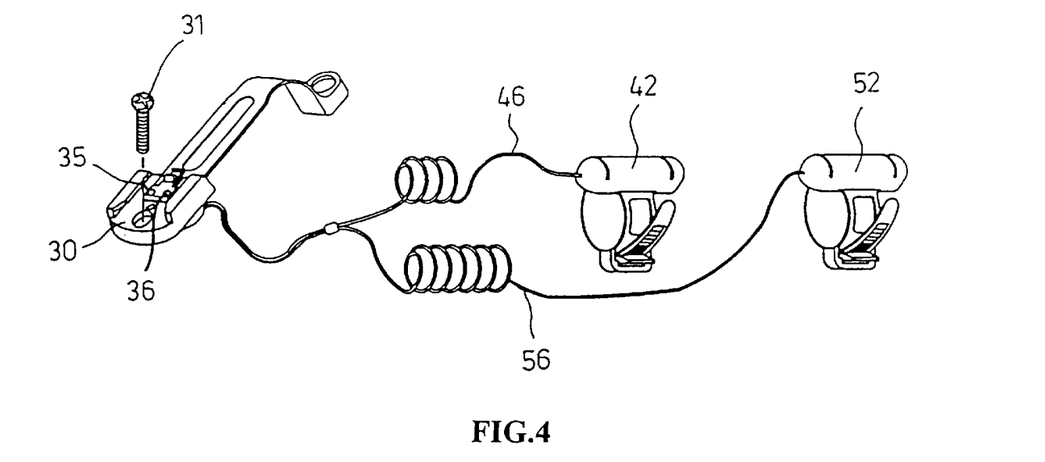
FIG. 4 is a perspective view showing the connection between the bracket of FIG. 3 and two sensors.
Figure 5:
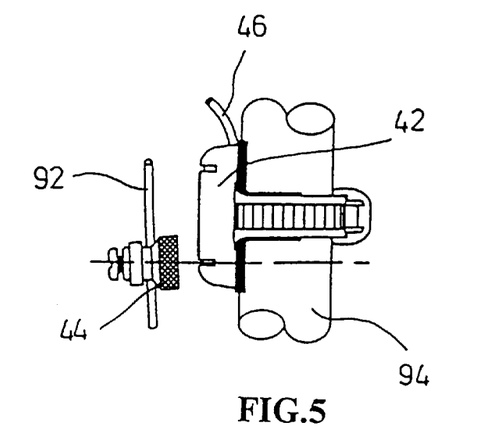
FIG. 5 is a side view showing the mounting manner of a wheel speed sensor and a wheel magnet.
Figure 6:
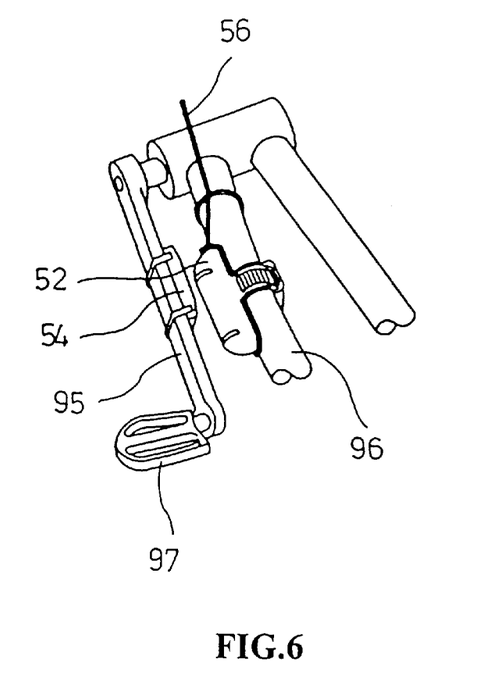
FIG. 6 is a perspective view showing the mounting manner of a pedal rpm sensor and a pedal magnet.

FIG. 4 shows the connection between the bracket 30 as shown in FIG. 3 and two sensors 42 and 52 via cables 46 and 56. FIG. 5 shows the position relationship between a magnet 44 mounted on one spoke 92 of the front wheel and the sensor 42 of FIG. 4 mounted on the inside of the fork 94, facing the magnet 44, and FIG. 6 shows the position relationship between a magnet 54 mounted on the inside of the crank 95 and the sensor 52 of FIG. 4 mounted on the chain stay 96, facing the magnet 54.

Among various data which can be displayed on the display 20 of the main unit 10, except the time data which is provided by a clock circuit built in the main unit 10, all the other data including the speed, the distance, the pedal rpm, etc., are obtained from signals supplied by the sensors 42 and 52 mounted on the fork 94 and the chain stay 96, respectively. The sensors 42 and 52 detect the numbers of rotation of the front wheel and the pedal crank 95 by sensing the associated magnets 44 and 54. The sensors 42 and 52 transmit thus detected signals via the cables 46 and 56 to the bracket 30. The signals are then transmitted to the microprocessor (not shown) in the main unit 10 through metal contacts 35 and 36 provided on the bracket 30 which are in electrical connection with the contacts 15 and 16 on the back of the main unit 10 when the main unit 10 is mounted on the bracket 30. The microprocessor performs, for example, identification, counting and calculation, on the supplied wheel rpm and pedal rpm data, and the processed data are then displayed on the display 20.

For example, the microprocessor of the main unit 10 calculates the speed by multiplying the wheel rpm with the circumferential length of the front wheel and calculates the distance traveled based on the calculated speed. In addition, the current pedal rpm or the average pedal rpm can be displayed to facilitate the rider's adjustment.

Figure 7:
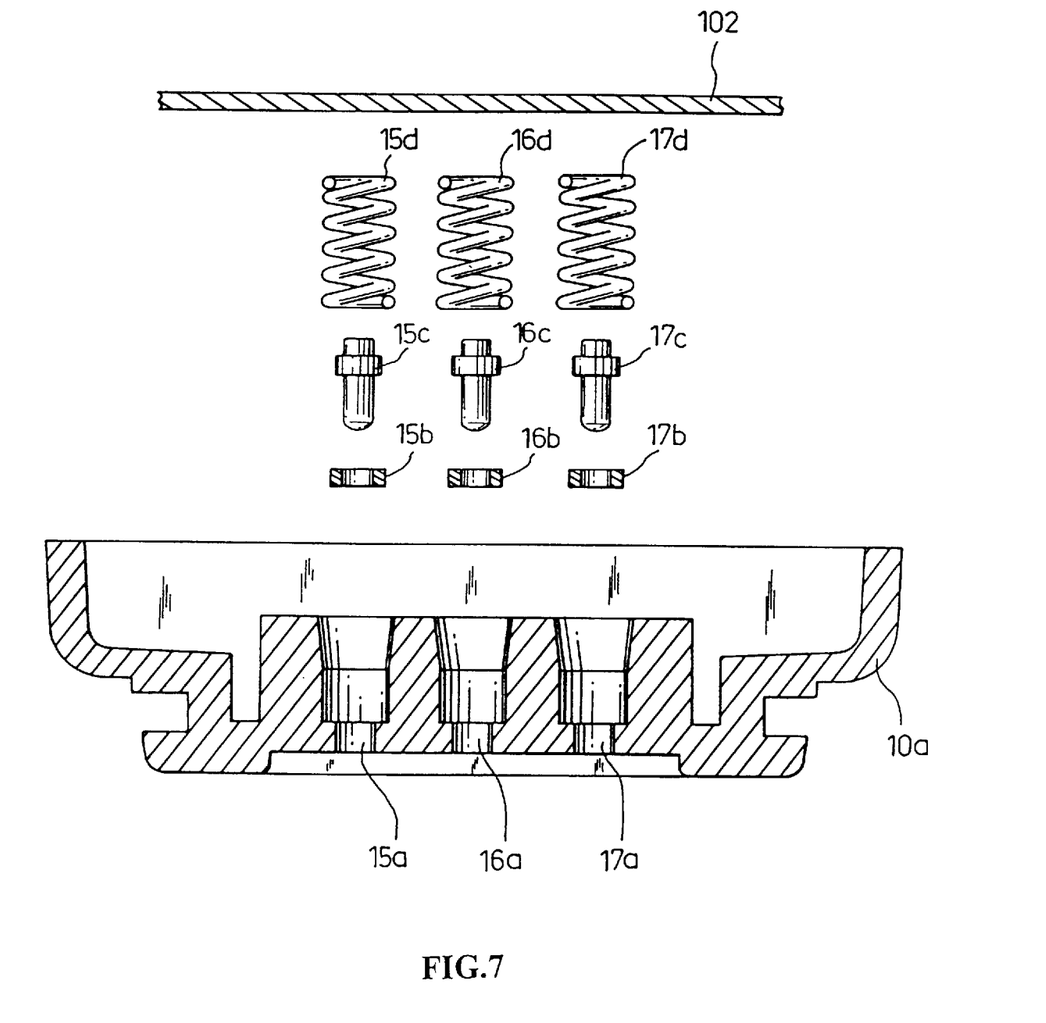
FIG. 7 is a sectional view showing water-sealed arrangements for metal contacts of the main unit.

Therefore, as far as the main unit 10 of a cycle computer having two sensors 42 and 52 as mentioned above is concerned, it is necessary to provide two contacts 15 and 16 for transmitting signals supplied from the two sensors, respectively, to the microprocessor in the main unit 10 and a contact 17 for a common ground. That is, it is necessary to provide at least three contacts on the back of the main unit. Each of these contacts 15, 16 and 17 has to be provided on the back of the main unit 10 with a waterproof arrangement in order to prevent water from leaking into the interior of the main unit 10 to thereby result in a short circuit phenomenon. A typical waterproof arrangement for the contact is shown in FIG. 7. Holes 15a, 16a and 17a are provided at the bottom of a lower case 10a of the main unit 10. Waterproof O-rings 15b, 16b and 17b are disposed in the holes 15a, 16a and 17a, respectively. Contact pins 15c, 16c and 17c are inserted to pass through the respective O-rings and protrude from the respective holes. Springs 15d, 16d and 17d for biasing the respective contact pins 15c, 16c and 17c outwards are provided between the pins and the printed circuit board 102. It is apparent that the waterproof arrangement for the contact is relatively complicated and the manufacturing cost therefore is high.

Recently, following the development of the handlebar-type gear shifting device and the electronic gear shifting device, there is a demand for a new generation cycle computer which in addition to display the aforementioned data concerning the speed, the distance, the time and the pedal rpm, is also capable of displaying data concerning the gear in operation, the torque exerted on the crank shaft, the ambient temperature, the geographical height and even the pulse of the rider. This means a significant increase in the number of the sensors and hence the metal contacts on the back of the main unit and the corresponding metal contacts on the bracket. Due to the significantly increased number of the metal contacts, it is difficult to keep the main unit compact. In addition, it is necessary to provide a waterproof arrangement for each of the contacts, thereby resulting in a very complicated structure and an increased manufacturing cost.

SUMMARY OF THE INVENTION

In view of the aforementioned problem, it is therefore an object of the invention to provide a bicycle cycle computer which is capable of displaying more kinds of information when compared with conventional cycle computers without increasing the number of contacts on the main unit thereof.

In order to achieve the above object, according to the invention, there is provided a bicycle cycle computer comprising a main unit having a primary microprocessor, a display and three contacts; a bracket mounted on the bicycle and on which the main unit is detachably mounted; a plurality of sensors including a wheel speed sensor, a pedal rpm sensor, a front gear sensor and a rear gear sensor which are mounted on the bicycle and sensors which are attached to a rider's body, for detecting various physiological conditions of the rider; and a secondary microprocessor provided on the bracket and connected between the plurality of sensors and the main unit, for receiving parallel signals outputted from the plurality of sensors, said secondary microprocessor converting the received parallel signals into a serial signal and generating a synchronous clock signal, which are transmitted to the main unit through two of the contacts of the main unit, processed by the primary microprocessor and displayed on the display.

The object of the invention can also be achieved by providing a bicycle cycle computer comprising a main unit having a primary microprocessor, a display and three contacts; a plurality of sensors including a wheel speed sensor, a pedal rpm sensor, a front gear sensor and a rear gear sensor which are mounted on the bicycle and sensors which are attached to a rider's body, for detecting various physiological conditions of the rider; and a secondary microprocessor provided on the bicycle and connected between the plurality of sensors and the main unit, for receiving parallel signals outputted from the plurality of sensors, the secondary microprocessor converting the received parallel signals into a serial signal and generating a synchronous clock signal, which are transmitted to the main unit through two of the contacts of the main unit, processed by the primary microprocessor and displayed on the display.

The object of the invention can also be achieved by providing a bicycle cycle computer comprising a main unit having a primary microprocessor, a display and three contacts; a bracket mounted on the bicycle and on which the main unit is detachably mounted; a plurality of sensors including a wheel speed sensor, a pedal rpm sensor, a front gear sensor and a rear gear sensor which are mounted on the bicycle and sensors which are attached to a rider's body, for detecting various physiological conditions of the rider; and a secondary microprocessor provided on the bracket and connected between the plurality of sensors and the main unit, for receiving parallel signals outputted from the plurality of sensors, the secondary microprocessor converting the received parallel signals into a serial signal and generating a synchronous clock signal, which are transmitted to the main unit through two of the contacts of the main unit, processed by the primary microprocessor and displayed on the display, wherein the primary microprocessor outputs a control signal based on the serial signal and the control signal is transmitted to an electronic automatic gear shifting device for performing gear shifting through the secondary microprocessor, the serial signal and the control signal being transmitted between the primary and the secondary microprocessors through the same contact.

The object of the invention can also be achieved by providing a bicycle cycle computer comprising a main unit having a primary microprocessor, a display and three contacts; a plurality of sensors including a wheel speed sensor, a pedal rpm sensor, a front gear sensor and a rear gear sensor which are mounted on the bicycle and sensors which are attached to a rider's body, for detecting various physiological conditions of the rider; and a secondary microprocessor provided on the bicycle and connected between the plurality of sensors and the main unit, for receiving parallel signals outputted from the plurality of sensors, the secondary microprocessor converting the received parallel signals into a serial signal and generating a synchronous clock signal, which are transmitted to the main unit through two of the contacts of the main unit, processed by the primary microprocessor and displayed on the display, wherein the primary microprocessor outputs a control signal based on the serial signal and the control signal is transmitted to an electronic automatic gear shifting device for performing gear shifting through the secondary processor, the serial signal and the control signal being transmitted between the primary and the secondary microprocessors through the same contact.

Preferably, a separated key buttons box is further provided on a handlebar of the bicycle and connected to the secondary microprocessor, for remotely controlling the main unit, so that the rider can select the displaying mode without moving his hands away from the handlebar.

Preferably, the display of the main unit displays one or simultaneously more of the speed, the pedal rpm, the gear in operation, the time, the mileage and the physiological condition of the rider.

DETAILED DESCRIPTION OF THE EMBODIMENTS

Figure 8:
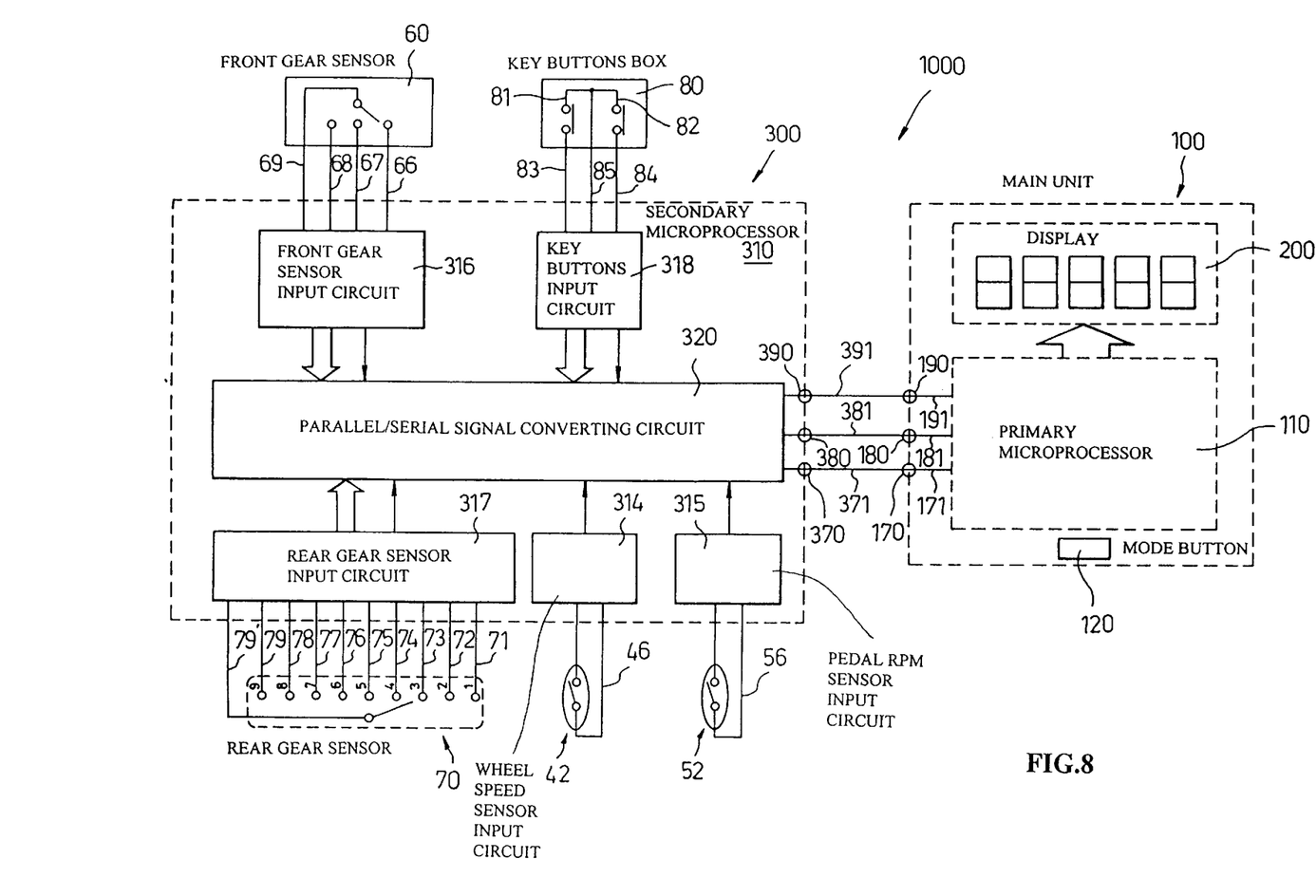
FIG. 8 is a block diagram showing a bicycle cycle computer according to a first embodiment of the invention.

FIG. 8 is a block diagram showing a cycle computer according to a first embodiment of the invention. As shown in FIG. 8, a cycle computer 1000 comprises a main unit 100 and a bracket 300. The main unit 100 is detachably mounted on the bracket 300 as described above in reference to FIG. 3. Similar to the conventional main unit 10 shown in FIGS. 1 and 2, the main unit 100 is provided with a primary microprocessor 110 and a display 200 for displaying various data processed by and supplied from the primary microprocessor 110. In addition, a mode button 120 for selecting different displaying modes is provided on the front surface of the main unit 100. Three metal contacts 170, 180 and 190 which are connected to the primary microprocessor 110 via signal transmission lines 171, 181 and 191, respectively, are provided on the back of the main unit 100. The contact 170 serves as a ground terminal, while the contact 180 is an input terminal for receiving a synchronous clock signal and the contact 190 is an input terminal for receiving a serial data signal (described in detail later). A waterproof arrangement as shown in FIG. 7 is provided for each of the contacts 170, 180 and 190.

The shape of the bracket 300 is substantially the same as that of the conventional bracket 30 as shown in FIGS. 3 and 4. However, according to the invention, a secondary microprocessor 310 is built in the bracket 300. Three metal contacts 370, 380 and 390 are provided on the surface of the bracket 300, and when the main unit 100 is mounted on the bracket 300, the contacts 170, 180 and 190 of the main unit 100 are brought into contact with the contacts 370, 380 and 390 of the bracket 300), respectively. The contacts 370, 380 and 390 are coLnected via signal transmission lines 371, 381 and 391 to three output terminals of a one-way parallel/serial signal converting circuit 320 (described in detail later) in the secondary microprocessor 310. The contact 370 serves as a ground terminal for the circuit 320. The contact 380 is used as a synchronous clock signal output terminal for the circuit 320 and the contact 390 is a serial data signal output terminal for the circuit 320.

As shown in FIG. 8, in addition to the one-way parallel/serial signal converting circuit 320, the secondary microprocessor 310 further comprises a wheel speed sensor input circuit 314, a pedal rpm sensor input circuit 315, a front gear sensor input circuit 316, a rear gear sensor input circuit 317, and a key buttons input circuit 318. Output signals from these circuits 314, 315, 316, 317 and 318 are transmitted to the one-way parallel/serial signal converting circuit 320.

A wheel speed sensor 42 mounted as shown in FIG. 5 is connected to the wheel speed sensor input circuit 314 via two signal transmission lines 46, and a pedal rpm sensor 52 mounted as shown in FIG. 6 is connected to the pedal rpm sensor input circuit 315 via two signal transmission lines 56.

A front gear sensor 60 mounted near one end of the bicycle handlebar is a three-position rotary switch which is connected to the front gear sensor input circuit 316 via three signal transmission lines 66, 67 and 68 and a ground wire 69. The front gear sensor 60 is coupled to a front gear shifting device (not shown) in order to detect the front gear in operation and supply the detected signal to the circuit 316.

A rear gear sensor 70 mounted near the other end of the bicycle handlebar is a nine-position rotary switch which is connected to the rear gear sensor input circuit 317 via nine signal transmission lines 71 to 79 and a ground wire 79. The rear gear sensor 70 is provided to detect the rear gear in operation and supply the detected signal to the circuit 317.

A key buttons box 80 provided near one end of the handlebar has two remote key buttons 81 and 82. The first key button 81 is provided for selecting the displaying mode of the display 200 and the second key button 82 is a start/stop key button for starting or stopping a function of the main unit 100. The key buttons box 80 is connected to the key buttons input circuit 318 via two lines 83 and 84 and a ground wire 85.

Next, the operation of the cycle computer comprising the above components will be described in the following.

When the main unit 100 is mounted on the bracket 300, the contacts 170, 180 and 190 on the back of the main unit 100 are brought into contact with the contacts 370, 380 and 390 on the bracket 300, respectively, thereby making the primary microprocessor 110 in the main unit 100 and the secondary microprocessor 310 built in the bracket 300 electrically connected.

When a rider is riding a bicycle equipped with the cycle computer according to the invention described above, a wheel speed signal detected by the wheel speed sensor 42 is transmitted to the wheel speed sensor input circuit 314 via lines 46 and then to the one-way parallel/serial signal converting circuit 320. Similarly, a pedal rpm signal detected by the pedal rpm sensor 52 is supplied to the pedal rpm sensor input circuit 315 via lines 56 and then to the one-way parallel/serial signal converting circuit 320.

In addition, a front gear shifting signal detected by the front gear sensor 60 coupled to the front gear shifting device is transmitted to the front gear sensor input circuit 316 and then to the converting circuit 320. Likewise, a rear gear shifting signal detected by the rear gear sensor 70 coupled to the rear gear shifting device is transmitted to the rear gear sensor input circuit 317 and then to the converting circuit 320.

A mode selecting signal is transmitted to the key buttons input circuit 3 18 and then to the converting circuit 320 if the key button 81 of the key buttons box 80 is pressed. On the other hand, if the key button 82 is pressed, a start/stop signal is outputted from the key buttons box 80 and transmitted to the key buttons input circuit 318 and then to the converting circuit 320.

Therefore, the one-way parallel/serial signal converting circuit 320 receives parallel input signals from the wheel speed sensor 42, the pedal rpm sensor 52, the front gear sensor 60, the rear gear sensor 70 and the key buttons box 80, and then converts the received parallel signals into a serial signal by means of parallel/serial signal conversion. The serial signal obtained after the conversion is transmitted from the secondary microprocessor 310 to the primary microprocessor 100 through the serial signal output terminal 390 of the former and the serial signal input terminal 190 of the later. At the same time, the one-way parallel/serial signal converting circuit 320 generates a synchronous clock signal which is transmitted to the primary microprocessor 100 through the synchronous clock signal output terminal 380 and the synchronous clock signal input terminal 180.

Figure 9:
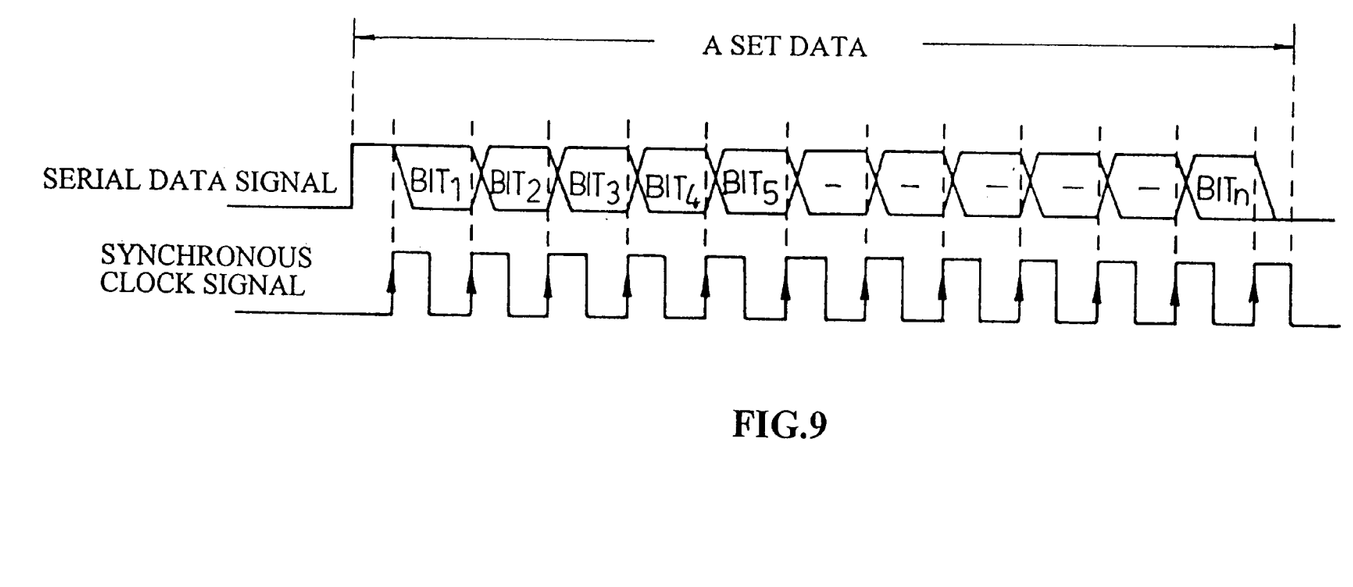
FIG. 9 is a wave form diagram showing a serial data signal and a synchronous clock signal.

The signals transmitted from the converting circuit 320 of the secondary microprocessor 310 to the primary microprocessor 110 are shown in FIG. 9. The serial signal comprises a set of data including, for example, BIT1 representing wheel speed data obtained from the wheel speed sensor 42, BIT2 representing pedal rpm data obtained from the pedal rpm sensor 52, BIT3 representing control data transmitted from the key buttons box 80, BIT4 representing front gear data obtained from the front gear sensor 60, BIT5 representing rear gear data obtained from the rear gear sensor 70, and so on.

The primary microprocessor 110 performs identification, counting, calculation and other processes on the received data as shown in FIG. 9, and displays the processed data requested by the rider on the display 200 of the main unit 100. Two or more kinds of data can be displayed on the display 200 simultaneously.

Since the signals supplied from the sensors 42, 52, 60 and 70 and the key buttons box 80 are converted into a serial signal as shown in FIG. 9 by the one-way parallel/serial signal converting circuit 320 in the secondary microprocessor 310 built in the bracket 300 before transmitted to the primary microprocessor 110 in the main unit 100, only three pairs of contacts are needed for the electrical connection between the bracket 300 and the main unit 100, that is, the pair of contacts 390 and 190 for transmitting the serial signal, the pair of contacts 380 and 180 for transmitting the synchronous clock signal, and the pair of contacts 370 and 170 for the ground wire. In other words, the main unit 100 is provided with only three contacts 170, 180 and 190. Therefore, the cycle computer according to the embodiment of the invention comprises more sensors and hence provides more data when compared with the conventional cycle computer without increasing the number of contacts on the back of the main unit. Consequently, the construction of the main unit remains compact and simple.

In addition, with the separated key buttons box provided near the handlebar of the bicycle and connected to the secondary microprocessor, the rider can select the displaying mode without moving his hands away from the handlebar.

Figure 10:
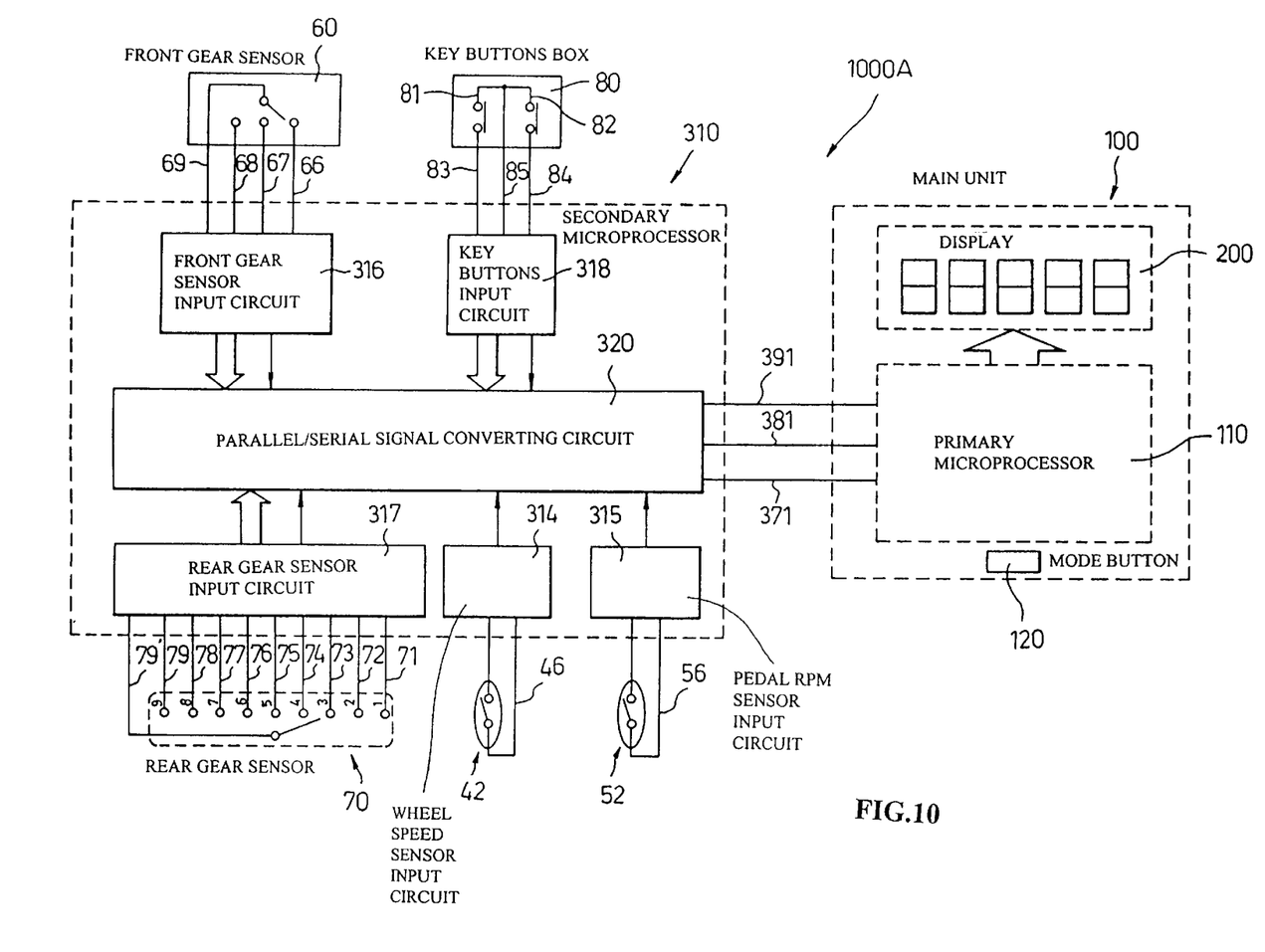
FIG. 10 is a block diagram showing a cycle computer according to a second embodiment of the invention.

FIG. 10 is a block diagram showing a cycle computer according to a second embodiment of the invention. The cycle computer 1000A shown in FIG. 10 is different from the cycle computer 1000 shown in FIG. 8 in that the bracket 300 in which the secondary microprocessor 310 is built according to the first embodiment is omitted in the second embodiment. That is, in the second embodiment, the main unit 100 is directly mounted on the handlebar, and the secondary microprocessor 310 is built in a suitable part of the bicycle. The aforementioned sensors including the wheel speed sensor 42, the pedal rpm sensor 52, the front gear sensor 60 and the rear gear sensor 70 and the key buttons box 80 are connected with the secondary microprocessor 310 via respective signal transmission lines 46, 56, 66 to 69, 71 to 79' and 83 to 85 as described in the first embodiment. The secondary microprocessor 310 is then connected to the primary microprocessor 110 via three lines 371, 381 and 391. Similarly, signals as shown in FIG. 9 are transmitted from a one-way parallel/serial signal converting circuit 320 in the secondary microprocessor 310 to the main unit 110 for processing and then the processed data are displayed on the display 200 based on the displaying mode selected by the rider.

Recently, electronic automatic gear shifting devices have been developed. In such a device, a torque sensor is used to detect the torque exerted on the crank shaft and a microprocessor is used to determine whether the detected torque is higher than a predetermined value. If the detected torque is higher than the predetermined value, it indicates that the torque exerted on the crank shaft is too large, and hence a gearing-up is desired in order to reduce the load of the rider. Accordingly, a control signal for gearing-up is outputted from the microprocessor and transmitted to the electronic automatic gear shifting device for performing the gearing-up operation. On the other hand, if the detected torque is lower than the predetermined value, then a gearing-down is desired. Similarly, a control signal for gearing-down is transmitted from the microprocessor to the electronic automatic gear shifting device for performing the gearing-down operation.

The aforementioned electronic automatic gear shifting device has been practically used, and the microprocessor in such a device can be integrated with the primary microprocessor in the main unit of the cycle computer according to the invention.

Figure 11:
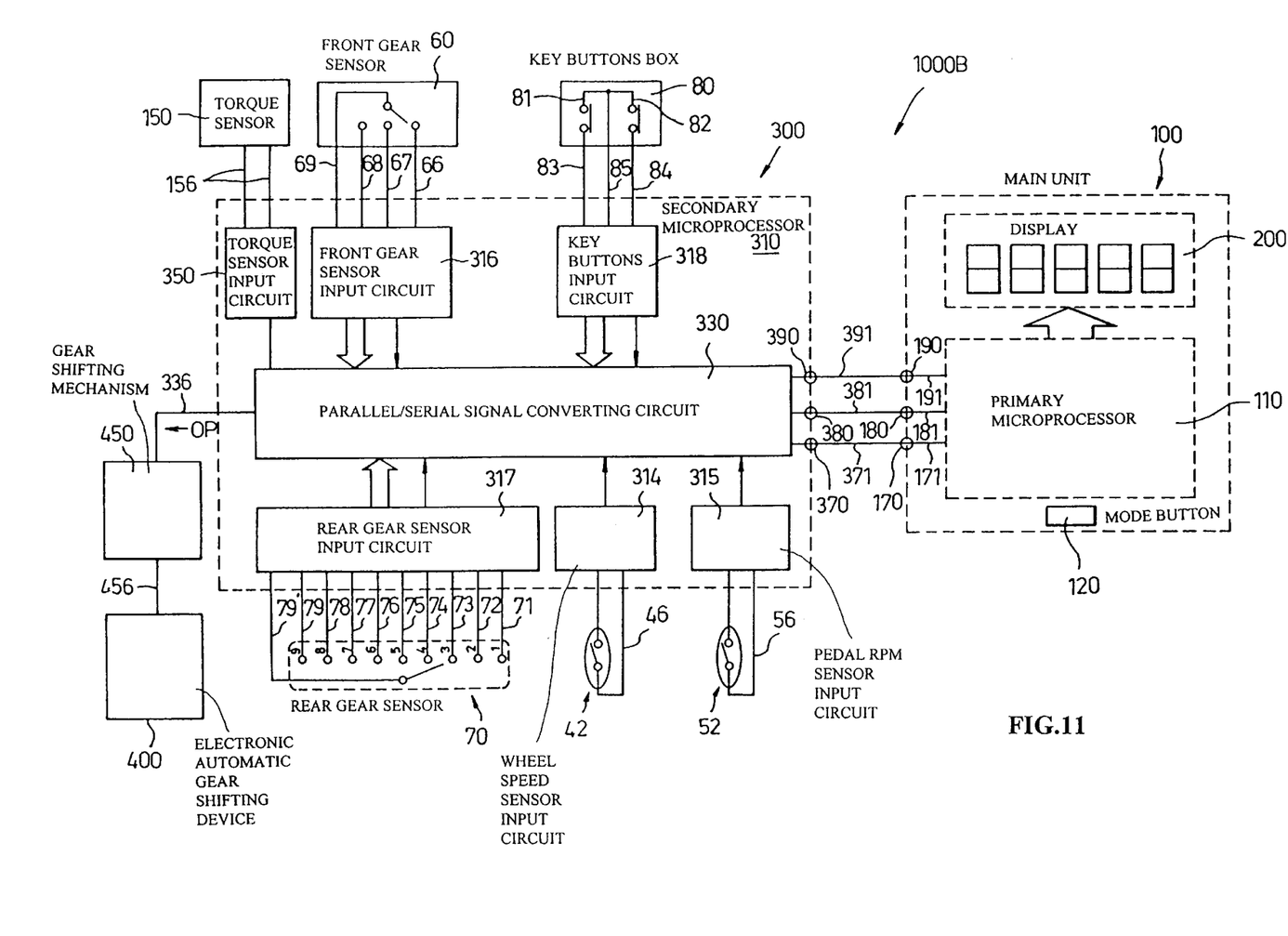
FIG. 11 is a block diagram showing a cycle computer according to a third embodiment of the invention.

FIG. 11 is a block diagram showing a cycle computer according to a third embodiment of the invention. In addition to the sensors described in the first embodiment, as shown in FIG. 11, the cycle computer 1000B according to the third embodiment further comprises a torque sensor 150 for detecting the torque exerted on the crank shaft. The detected signal outputted from the torque sensor 150 is transmitted to a torque sensor input circuit 350 via lines 156, and then to a two-way parallel/serial signal converting circuit 330 in the secondary microprocessor 310 built in the bracket 300. The signal from the torque sensor 150 is converted together with signals from other sensors (42, 52, 60, 70) into a serial signal which is transmitted from the two-way parallel/serial signal converting circuit 330 to the primary microprocessor 110 in the main unit 100 through the serial signal output terminal 390. The primary microprocessor 110 determines whether the torque exerted on the crank shaft is higher or lower than a predetermined value based on the sional obtained from the torque sensor 150. If it is determined that the torque is higher than the predetermined value, then the torque exerted on the crank shaft is too large, and hence a gearing-up is desired. Accordingly, a control signal is outputted from the primary microprocessor 110 and transmitted to the secondary microprocessor 310 which then outputs a control signal OP for gearing-up to a gear shifting mechanism 450 of an electronic automatic gear shifting device 400 for performing the gearing-up operation through signal transmission lines 336 and 456. On the other hand, if the torque is lower than the predetermined value, it indicates that a gearing-down is desired. Therefore, the primary microprocessor 110 outputs a control signal for gearing-down which is then transmitted to the gear shifting mechanism 450 of the electronic automatic gear shifting device 400 for performing the gearing-down operation.

In this case, the control signals for gearing-up and gearing-down outputted from the primary microprocessor 110 are transmitted to the secondary microprocessor 310 via the existing lines 191 and 391 and the metal contacts 190 and 390.

The cycle computer 1000B according to the third embodiment of the invention can share the same microprocessor with an existing electronic automatic gear shifting device, thereby increasing the function of the cycle computer.

Figure 12:
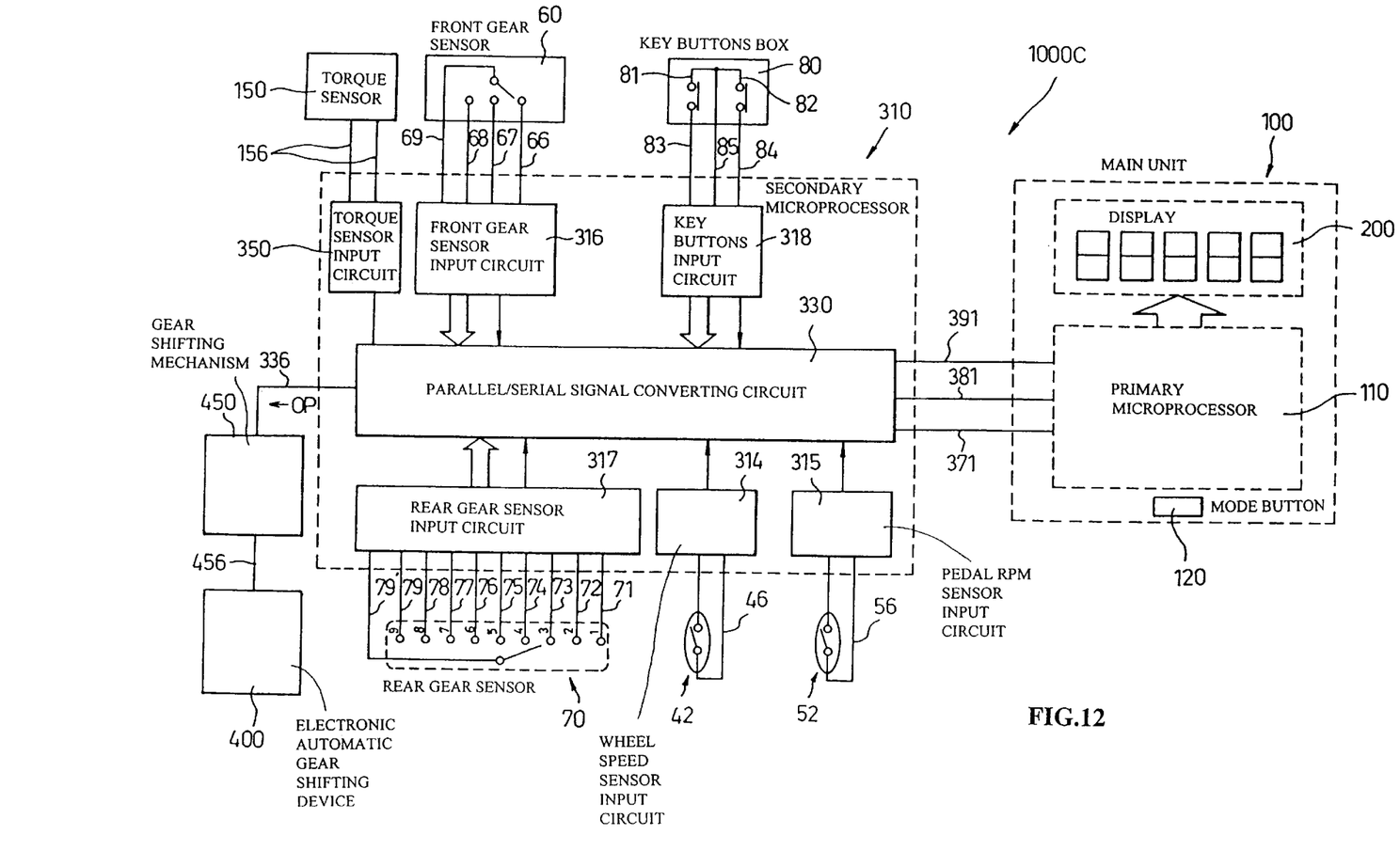
FIG. 12 is a block diagram showing a cycle computer according to a fourth embodiment of the invention.

FIG. 12 is a block diagram showing a cycle computer according to a fourth embodiment of the invention. The cycle computer 1000C shown in FIG. 12 is different from the cycle computer 1000B shown in FIG. 11 in that the bracket 300 is omitted. That is, in the fourth embodiment, the main unit 100 is directly mounted on the handlebar, and the secondary microprocessor 310 is built in a suitable part of the bicycle. The aforementioned sensors including the wheel speed sensor 42, the pedal rpm sensor 52, the front gear sensor 60, the rear gear sensor 70 and the torque sensor 150 and the key buttons box 80 are connected with the secondary microprocessor 310 via respective signal transmission lines 46, 56, 66 to 69, 71 to 79', 156 and 83 to 85 as described in the third embodiment. The secondary microprocessor 310 is then connected to the primary microprocessor 110 via three lines 371, 381 and 391, thereby achieving the same function as that described above in connection with the third embodiment.

Although in the four preferred embodiments described above, sensors for detecting the physiological conditions of the rider and sensors for detecting the ambient conditions such as the temperature and the pressure are not incorporated therein, the addition of these sensors and other sensors becomes apparent for those skilled in the same field in the light of the teaching disclosed above.

While the present invention has been described above in detail in connection with its preferred embodiments, it is to be understood that the present invention is not limited to the details of the illustrated embodiments, but may have various changes, modifications and improvements, which may occur to those skilled in the art, without departing from the spirit and the scope of the present invention.

What is claimed is:

1. A bicycle computer comprising:
   a first processing unit disposed in a mounting bracket for mounting the bicycle computer to the bicycle;
   a plurality of sensors, each sensor providing sensor data in parallel format to the first processing unit;
   wherein the first processing unit receives the sensor data from the plurality of sensors in parallel format and outputs serial format data corresponding to the sensor data;
   a separate main unit housing including a display wherein the main unit housing is detachably mounted to the mounting bracket; and a second processing unit for receiving the serial format data from the first processing unit and for outputting display data to the display.

2. The computer according to claim 1 wherein the plurality of sensors comprise at least two sensors selected from the group consisting of a wheel speed sensor, a pedal rpm sensor, a front gear sensor, a rear gear sensor, a torque sensor, a button sensor, and a sensor for detecting physiological conditions of a rider.

3. The computer according to claim 1 further comprising a manually operated button for providing button data in parallel format to the first processing unit.

4. The computer according to claim 1 wherein the first processing unit includes a command output terminal for outputting a control command.

5. The computer according to claim 1 wherein the second processing unit is disposed in the main unit housing.

6. The computer according to claim 5 wherein the mounting bracket includes:
a first output contact operatively coupled to the first processing unit for receiving the serial format data from the first processing unit; and
a second output contact operatively coupled to the first processing unit for receiving clock data from the first processing unit;
wherein the main unit housing includes:
a first input contact operatively coupled to the second processing unit for communicating the serial format data to the second processing unit; and
a second input contact operatively coupled to the second processing unit for communicating the clock data to the second processing unit;
wherein the first output contact presses against the first input contact for forming a first contact; and
wherein the second output contact presses against the second input contact for forming a second contact.

7. The computer according to claim 6 wherein only a single first contact communicates the serial format data from the first processing unit to the second processing unit.

8. The computer according to claim 6 wherein only a single second contact communicates the clock data from the first processing unit to the second processing unit.

9. The computer according to claim 6 wherein only a single first contact communicates the serial format data from the first processing unit to the second processing unit, and wherein only a single second contact communicates the clock data from the first processing unit to the second processing unit.

10. The computer according to claim 9 wherein the mounting bracket includes only a single third output contact operatively coupled to the first processing unit for receiving a ground signal from the first processing unit, wherein the main unit housing includes only a single third input contact operatively coupled to the second processing unit for communicating the ground signal to the second processing unit, wherein the third output contact presses against the third input contact for forming a third contact, and wherein only the first contact, the second contact and the third contact communicate signals between the first processing unit and the second processing unit.

11. The computer according to claim 6 wherein the second processing unit communicates control command data to the first processing unit through the first contact, and wherein the first processing unit includes a command output terminal for outputting control commands in response to the control command data.

12. The computer according to claim 1 further comprising:
a first signal line operatively coupled between the first processing unit and the second processing unit for communicating the serial format data from the first processing unit to the second processing unit; and
a second signal line operatively coupled between the first processing unit and the second processing unit for communicating clock data from the first processing unit to the second processing unit.

13. The computer according to claim 12 wherein only a single first signal line communicates the serial format data from the first processing unit to the second processing unit.

14. The computer according to claim 12 wherein only a single second signal line communicates the clock data from the first processing unit to the second processing unit.

15. The computer according to claim 12 wherein only a single first signal line communicates the serial format data from the first processing unit to the second processing unit, and wherein only a single second signal line communicates the clock data from the first processing unit to the second processing unit.

16. The computer according to claim 15 wherein only a single third signal line communicates a ground signal from the first processing unit to the second processing unit, and wherein only the first signal line, the second signal line and the third signal line communicate signals between the first processing unit and the second processing unit.

17. The computer according to claim 12 wherein the second processing unit communicates control command data to the first processing unit through the first signal line, and wherein the first processing unit includes a command output terminal for outputting control commands in response to the control command data.

18. A bicycle computer comprising:
a mounting bracket for mounting the computer to the bicycle, wherein the mounting bracket includes a first processing unit;
a separate main unit housing including a second processing unit, wherein the main unit housing is detachably mounted to the mounting bracket;
a sensor for providing sensor data to the first processing unit; and
wherein the first processing unit receives the sensor data and outputs serial format data corresponding to the sensor data to the second processing unit.

19. The computer according to claim 18 wherein the mounting bracket includes:
a first output contact operatively coupled to the first processing unit for receiving the serial format data from the first processing unit; and
a second output contact operatively coupled to the first processing unit for receiving clock data from the first processing unit;
wherein the main unit housing includes:
a first input contact operatively coupled to the second processing unit for communicating the serial format data to the second processing unit; and
a second input contact operatively coupled to the second processing unit for communicating the clock data to the second processing unit;
wherein the first output contact presses against the first input contact for forming a first contact; and
wherein the second output contact presses against the second input contact for forming a second contact.

20. The computer according to claim 19 further comprising a display disposed in the main unit housing, wherein the second processing unit outputs display data to the display.

21. The computer according to claim 19 wherein only a single first contact communicates the serial format data from the first processing unit to the second processing unit.

22. The computer according to claim 19 wherein only a single second contact communicates the clock data from the first processing unit to the second processing unit.

23. The computer according to claim 19 wherein only a single first contact communicates the serial format data from the first processing unit to the second processing unit, and wherein only a single second contact communicates the clock data from the first processing unit to the second processing unit.

24. The computer according to claim 23 wherein the mounting bracket includes only a single third output contact operatively coupled to the first processing unit for receiving a ground signal from the first processing unit, wherein the main unit housing includes only a single third input contact operatively coupled to the second processing unit for communicating the ground signal to the second processing unit, wherein the third output contact presses against the third input contact for forming a third contact, and wherein only the first contact, the second contact, and the third contact communicate signals between the first processing unit and the second processing unit.

25. The computer according to claim 19 wherein the second processing unit communicates control command data to the first processing unit through the first contact, and wherein the first processing unit includes a command output terminal for outputting control commands in response to the control command data.

26. A bicycle computer comprising:
   a mounting bracket for mounting the computer to the bicycle, wherein the mounting bracket includes a first processing unit having a sensor data input port;
   a separate main unit housing including a second processing unit, wherein the main unit housing is detachably mounted to the mounting bracket; and
   wherein the first processing unit outputs data corresponding to data received at the sensor data input port to the second processing unit.

27. The computer according to claim 26 further comprising a display for receiving display data from the second processing unit.

28. The computer according to claim 27 wherein the display is disposed on the main unit housing.

29. A bicycle computer comprising:
   a first support for mounting to the bicycle;
   a first processing unit disposed on the first support, wherein the first processing unit includes a parallel data input port and a serial data output port;
   a second support for mounting to the bicycle;
   a separate second processing unit detachably disposed on the second support, wherein the second processing unit includes a serial data input port; and
   wherein the first processing unit outputs data corresponding to data received at the parallel data input port in serial format tlirough the serial data output port to the serial data input port of the second processing unit.

30. A bicycle computer comprising:
   a first support for mounting to the bicycle;
   a first processing unit disposed on the first support, wherein the first processing unit includes a parallel data input port and a serial data output port including an output contact disposed on an output connector;
   a second support for mounting to the bicycle;
   a separate second processing unit disposed on the second support, wherein the second processing unit include a serial data input port including an input contact disposed on an input connector;
   a latching mechanism for detachably coupling the input connector to the output connector so that the input contact contacts the output contact; and
   wherein the first processing unit outputs data corresponding to data received at the parallel data input port in serial format to the output contact.

\* \* \* \* \*